(12) United States Patent
Kim et al.

(10) Patent No.: US 8,270,975 B2
(45) Date of Patent: Sep. 18, 2012

(54) METHOD OF MANAGING NETWORK TRAFFIC WITHIN A WIRELESS NETWORK

(75) Inventors: Hongseok Kim, Austin, TX (US);
Xiangying Yang, Portland, OR (US);
Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 540 days.

(21) Appl. No.: 12/586,084

(22) Filed: Sep. 16, 2009

(65) Prior Publication Data
US 2010/0173631 A1    Jul. 8, 2010

Related U.S. Application Data

(60) Provisional application No. 61/142,582, filed on Jan. 5, 2009.

(51) Int. Cl.
*H04W 36/00* (2009.01)
(52) U.S. Cl. ........................ 455/436; 455/445; 455/456.1
(58) Field of Classification Search .................. 455/436, 455/445
See application file for complete search history.

(56) References Cited

U.S. PATENT DOCUMENTS

| | | | |
|---|---|---|---|
| 2005/0176440 A1* | 8/2005 | Sang et al. | 455/453 |
| 2006/0166677 A1 | 7/2006 | Derakshan et al. | |
| 2007/0140163 A1 | 6/2007 | Meier et al. | |

FOREIGN PATENT DOCUMENTS

| | | |
|---|---|---|
| KR | 10-2005-86235 B1 | 5/2006 |
| KR | 10-2008-41300 B1 | 6/2008 |
| WO | 2010/078589 A2 | 7/2010 |
| WO | 2010/1078589 A3 | 8/2010 |

OTHER PUBLICATIONS

International Preliminary Report on Patentability received for PCT Patent Application No. PCT/US2010/020147, mailed on Jul. 14, 2011, 6 pages.
U.S. Patent Application entitled "Advanced Wireless Communication Systems and Techniques", Filed Jan. 5, 2009, U.S. Appl. No. 61/142,582.
Sang, Aimin, et al., "Coordinated load balancing, handoff/cell-site selection, and scheduling in multi-cell packet data system", Wireless Netw 2008 14: 103-120, DOI 10.1007/s11276-006-8533-7, Published Jun. 9, 2006, pp. 103-120.
Mo, Jeonghoon, et al., "Fair End-to-End Window-Based Congestion Control", IEEE/ACM Transactions on Networking, vol. 8, No. 5, Oct. 2000, pp. 556-567.
International Search Report and Written Opinion received for PCT Patent Application No. PCT/US2010/020147, mailed on Jun. 30, 2010, 11 pages.

* cited by examiner

*Primary Examiner* — Dwayne Bost
*Assistant Examiner* — Joshua Schwartz
(74) *Attorney, Agent, or Firm* — Kenneth A. Nelson

(57) ABSTRACT

A method of managing network traffic within a wireless network (100) comprises identifying a plurality of base stations (111, 121, 131) within the wireless network, categorizing each one of the plurality of base stations according to its type, setting a load balancing parameter ($\alpha$) for each one of the plurality of base stations according to its type, and, for a handover event involving a handover from a first one of the plurality of base stations to a second one of the plurality of base stations, selecting the second one of the plurality of base stations according to a process that takes into account the load balancing parameters of both the first one of the plurality of base stations and the second one of the plurality of base stations.

18 Claims, 5 Drawing Sheets

METHOD OF MANAGING NETWORK TRAFFIC WITHIN A WIRELESS NETWORK

PRIORITY CLAIM

This application claims the benefit of priority under 35 U.S.C. §119(e) to U.S. Provisional Patent Application Ser. No. 61/142,582, filed Jan. 5, 2009, which is incorporated herein by reference in its entirety.

FIELD OF THE INVENTION

The disclosed embodiments of the invention relate generally to wireless networks, and relate more particularly to managing network traffic within such wireless networks.

BACKGROUND OF THE INVENTION

Wireless networks enable the transmission of voice, data, and other information from one point to another without the use of wires. A common type of wireless network is a cellular network in which each of a number of transceivers (referred to herein as a "base station" (or "BS")) provides network coverage within a cell, that is, within a portion of the network, surrounding the base station. The network is made up of multiple adjoining or overlapping cells. A wireless communications device (referred to herein as a "mobile station" (or "MS")) located (temporarily) in a network cell establishes a communications link with the cell's base station and thereby gains access to voice and/or other data being transmitted across the network. Examples of mobile stations include devices such as smartphones or other cellular telephone handsets, mobile computers such as laptops and notebooks, or the like.

When a mobile station enters the network, or when it approaches a cell edge, a decision must be made regarding the proper base station/network cell with which to associate the mobile station. The association between mobile station and base station/network cell has traditionally been based on the point of view of the mobile station: when the MS first enters the network, it scans the signal strength from the neighboring base stations and determines the signal to interference and noise ratio (SINR) for each. Then, from Shannon's capacity theorem, the achievable spectral efficiency is computed as $r=\log_2(1+SINR)$. The mobile station then selects the base station with which the highest spectral efficiency is achievable and an association is formed with that base station.

BRIEF DESCRIPTION OF THE DRAWINGS

The disclosed embodiments will be better understood from a reading of the following detailed description, taken in conjunction with the accompanying figures in the drawings in which.

Figure 1:
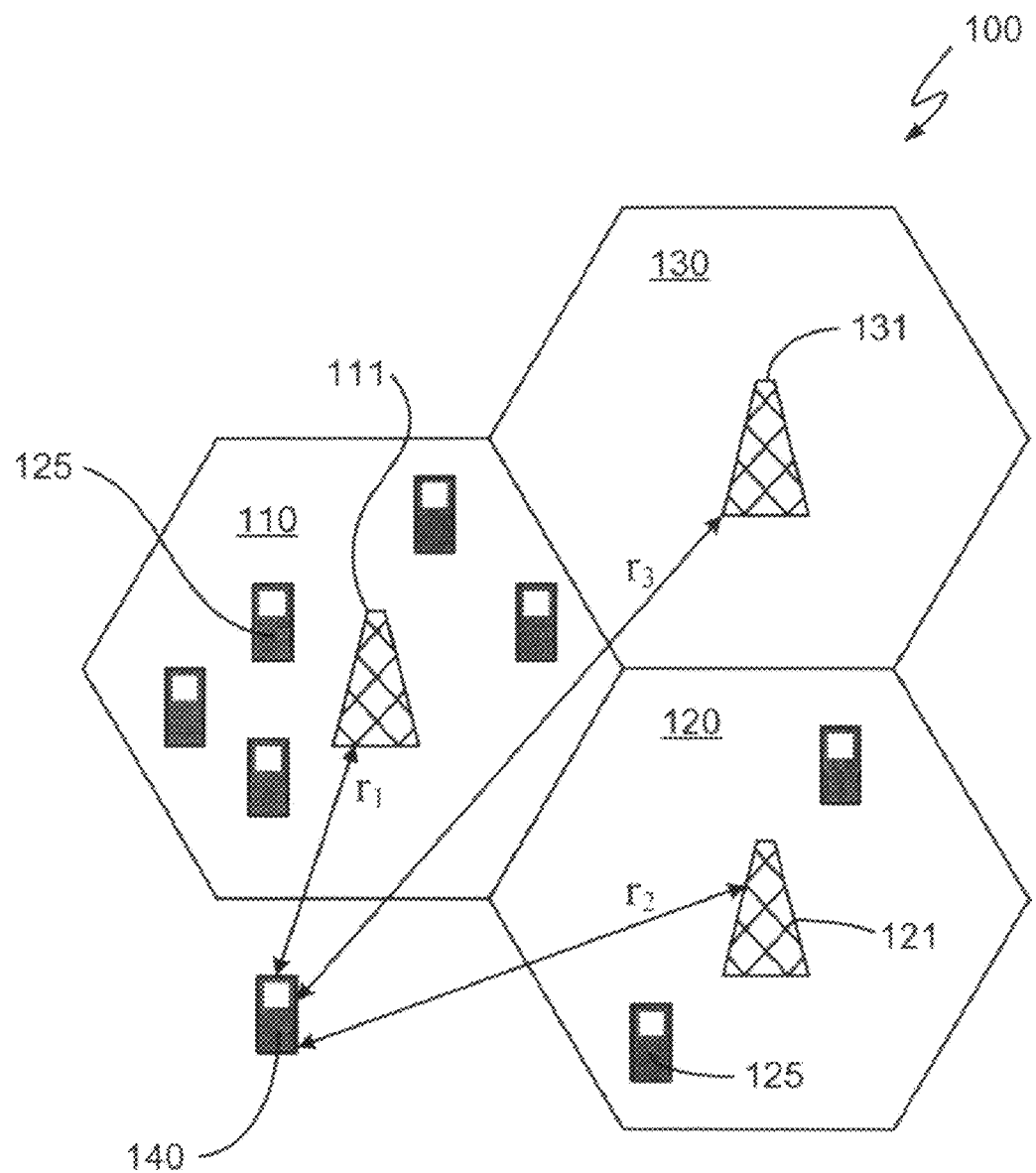
FIG. 1 is a schematic representation of a wireless network in which embodiments of the invention may find application.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION OF THE DRAWINGS

In one embodiment of the invention, a method of managing network traffic within a wireless network comprises identifying a plurality of base stations within the wireless network, categorizing each one of the plurality of base stations according to its type, setting a load balancing parameter for each one of the plurality of base stations according to its type, and, for a handover event involving a handover from a first one of the plurality of base stations to a second one of the plurality of base stations, selecting the second one of the plurality of base stations according to a process that takes into account the load balancing parameters of both the first one of the plurality of base stations and the second one of the plurality of base stations.

Embodiments of the invention may find application in a wireless local area network (WLAN), a wireless Metropolitan area network (WMAN) including a WiMAX (Worldwide Interoperability for Microwave Access) network or the like, a cellular telephone network including 3GPP GSM/EDGE and CDMA2000, a cellular data network including 3GPP HSDPA, LTE and 3GPP2 UMB or network based on their evolving standards, or the like.

As stated earlier, cell association has traditionally been done based on the maximum received SINR at the mobile station. This association scheme is optimal when network cell loads are symmetric, a situation that rarely if ever applies to real network traffic conditions. For real networks, load balancing is required in order to account for the asymmetry of traffic cell loads. Load balancing is important in order to increase cell throughput and reduce user-experienced delay in file transfers.

There have existed some load balancing operations, but they are just ad-hoc and heuristic. Those existing protocols cannot guarantee the optimal network operation in terms of load balancing, and likely cause uncontrolled/unsuccessful handovers (HO) because a mobile station's HO decision could be (and often is) different from a base station's HO decision without a well-defined framework. In fact, there exists no systematic framework, as proposed by embodiments of the invention, sufficient to allow load balancing policies to be defined, used, and managed with a few key parameters in the system configuration broadcast. By contrast, incorporating embodiments of the invention into the standard can ensure networks operate in the desired optimized regime with a few key configurable parameters without unexpected cell selection behavior during HO and network entry. Embodiments of the invention can be applied to either MS-controlled or BS-controlled HO with the same expected performance. The degree of load balancing is controlled by the parameter $\alpha$, as discussed below. Embodiments of the invention also consider the mobility and HO cost, parameterized as $\beta$ as is also discussed below. Existing solutions do not consider these parameters.

Furthermore, speaking particularly of WiMAX networks, embodiments of the invention propose at least two important components that are not present in current solutions but are required to significantly enhance WiMAX's cell association algorithm. Supporting load balancing is expected to be included in IEEE 802.16m and competing 3GPP standards. Embodiments of the invention allow the network to operate at different operation modes (best connectivity, best expected throughput, best load balancing) with a simple system configuration parameter. In addition, embodiments of the invention allow efficient HO decisions in an overlay network, which IEEE 802.16m is to support.

Embodiments of the invention improve network traffic management by considering the traffic load of each cell when making a determination regarding the proper base station with which to associate a mobile station. In addition to the cell load and channel quality (including SINR), embodiments of the invention also consider mobile station mobility as it pertains to cell association. In cases where channel quality is high and/or traffic load is low but cell radius is small frequent HO may occur, and HO cost may nullify the benefit of high channel quality and/or low load. This problem becomes more acute when wireless networks are heterogeneous, i.e., when they consist of more than one of macro, micro, pico, femto, and/or relay cells or the like, because different cell types have different cell radii and HO interval. Thus to maximize cell throughput as well as to keep the expected HO cost reasonably low, embodiments of the invention make use of a cell association algorithm based on channel quality, cell load, and MS mobility, as will be discussed in more detail below. The benefit is significant and the incurred overhead/complexity is minimal.

Referring now to the drawings, FIG. 1 is a schematic representation of a wireless network 100 in which embodiments of the invention may find application. As an example, wireless network 100 may be a WLAN, a WMAN including a WiMAX network or the like, a cellular telephone network, or some other wireless network as known in the art.

As illustrated in FIG. 1, wireless network 100 has a cellular structure comprising cells 110, 120, and 130, which are shown as a representative sample of what may be a larger number of similar cells in wireless network 100. Cells 110, 120, and 130 contain, respectively, a base station 111, a base station 121, and a base station 131. Each cell also contains some number of mobile stations 125 (which number can be zero). In the illustrated embodiment, cell 110 contains five mobile stations 125, cell 120 contains two, and cell 130 contains zero. Under real operating conditions, the number of mobile stations 125 within each cell is continuously changing, as mobile stations move from one cell to another, enter and exit the network, etc. The traffic load of each base station depends on the number of mobile stations associated with it. A base station utilization factor $\rho$ is used herein to represent the traffic load of each base station or, equivalently (at least in cases like those illustrated in FIG. 1 where each cell contains only a single base station), of each cell. The base station utilization factor $\rho$ is defined as the busy fractional time of the base station, which is equivalent to 1−BS idle time.

Cell association has two perspectives: the user's (or mobile station's) point of view, and the network's (or base station's) point of view. Traditionally, as mentioned above, cell association has been based on the user's point of view: when a mobile station first enters the network it scans the signal strength from the neighboring base stations and computes the SINR for each base station. The mobile station then selects the base station with which the highest spectral efficiency, determined from Shannon's capacity theorem, e.g., is achievable. As was also mentioned, this technique for determining proper cell association works well when the entire network is very lightly loaded, as, for example, when there are only a few mobile stations in the system, or when cell loads are uniform. This cell selection rule based on the above assumption (uniform cell loading, i.e., uniform traffic loading across all cells within range of the entering mobile station) will be referred to herein as the "baseline condition" (or simply as the "baseline"). Note that the baseline does not take into account network traffic conditions.

For real (non-uniform) networks, the traffic condition must be considered in order to optimize the association decision. Referring still to FIG. 1, a mobile station 140 has just entered wireless network 100 or is about to leave the cell (not illustrated) with which it is currently associated. In any event, a decision must be made regarding which of the available network cells mobile station 140 must now be associated with. As will be discussed in more detail below, when mobile station 140 enters wireless network 100 it scans three neighboring base stations, i.e., base stations 111, 121, and 131 (which base stations represent all of the base stations in range of mobile station 140 or otherwise available to it, whether three or some smaller or larger number) and computes the achievable rates, $r_1$, $r_2$, and $r_3$ from base stations 111, 121, and 131, respectively. Suppose that $r_1$ is the highest (a reasonable supposition because mobile station 140 is closest to base station 111). According to the baseline, mobile station 140 should be associated with base station 111. However, if base station 111 is congested (as in the illustrated embodiment) and thus the utilization is high (i.e., close to 1), the baseline may not represent the optimal choice. Instead, mobile station 140 may select (or have selected for it) base station 121 if $\rho_2$ is reasonably less than $\rho_1$. The same rule can be applied to base station 131. Thus, the question becomes the following: considering both the achievable rate r and the base station utilization factor $\rho$, what is the optimal cell site selection strategy? In this context "optimal" can mean any of several things, including the strategy that achieves minimum file transfer delay, the strategy that achieves the best signal quality/best connectivity, or the strategy that achieves the greatest file transfer reliability, among others.

Figure 2:
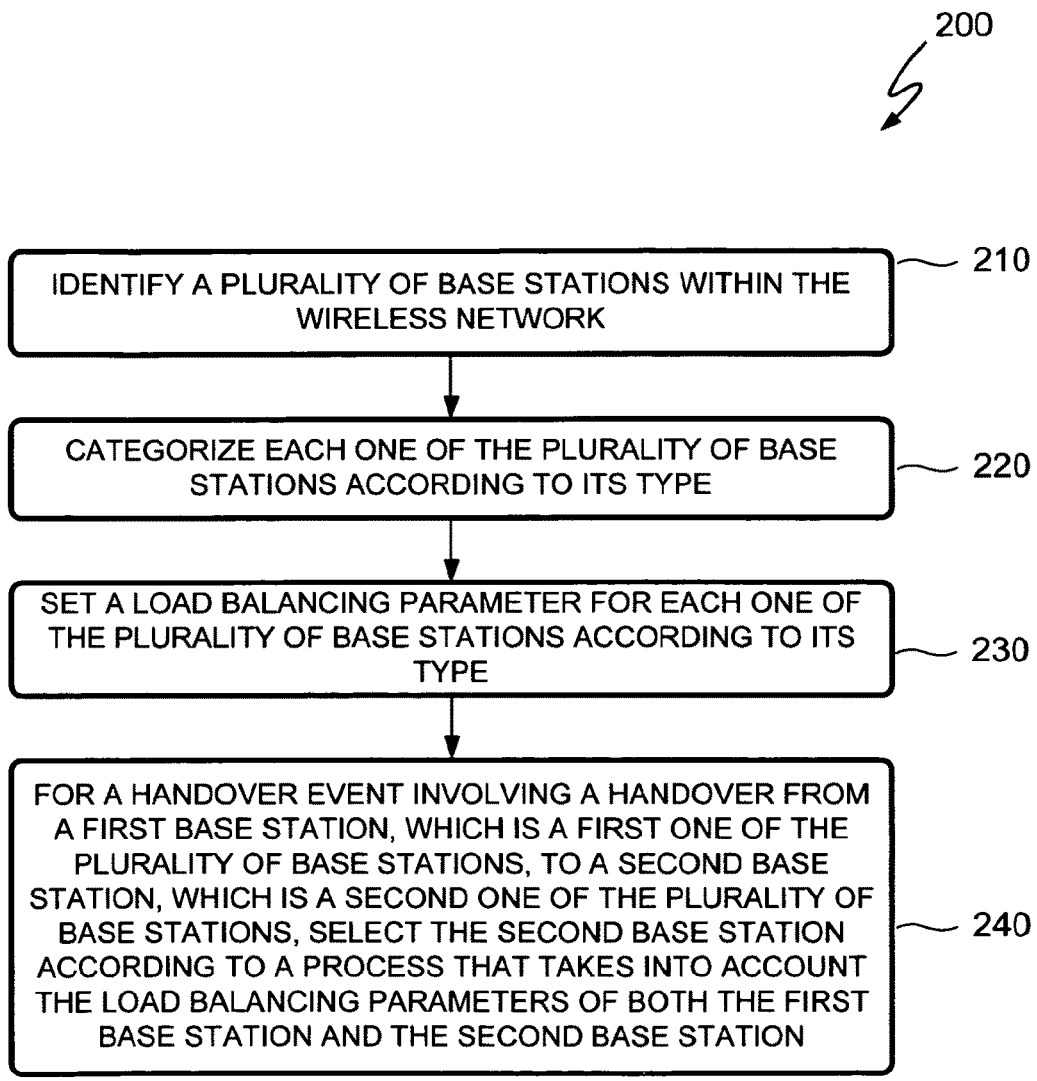
FIG. 2 is a flowchart illustrating a method of managing network traffic within a wireless network according to an embodiment of the invention.

FIG. 2 is a flowchart illustrating a method 200 of managing network traffic within a wireless network according to an embodiment of the invention. As an example, the wireless network can be similar to wireless network 100 that is shown in FIG. 1. Method 200 allows the base stations within a wireless network each to achieve different load balancing targets by setting their own different load balancing parameters. Note that each load balancing parameter can be varied dynamically by the base stations according to their associated cell type or to changing conditions such as traffic loading and the like, and can even define different load balancing parameters for different mobile stations.

In some sense, for example, embodiments of the invention can be thought of as frameworks to introduce flexibilities. The following scenario is one example. For mobile stations that are at the cell edge and for which connectivity is therefore a potential issue a base station may use a rule of $\alpha=0$. For an overlay network where load balancing is a main concern the base station may use a rule of $\alpha=2$. For some users with a premium subscription the base station may use a rule of $\alpha=1$. In real networks the network operator may decide to build such rules into a configuration broadcast or to hard-code them into a device. This may also be done in a combined way. For example, the network only switches between $\alpha=0$ and $\alpha=1$ based on the cell's load, and $\alpha=1$ is hard-coded in the device with a premium subscription. $\alpha=1$ overrides $\alpha=0$ to give these users the best service when the network load is low, but $\alpha=1$ becomes invalid if the network broadcasts $\alpha=2$ to indicate load balancing is critical at the moment. If the load balancing parameter is broadcast on the air link it can be changed from time to time, though likely not very frequently (perhaps every a few hours).

A step 210 of method 200 is to identify a plurality of base stations within the wireless network. The plurality of base stations is made up of the group of base stations within range of or otherwise available to form an association with a particular mobile station. As an example, the plurality of base stations can be similar to the group of base stations 111, 121, and 131 that are shown in FIG. 1.

A step 220 of method 200 is to categorize each one of the plurality of base stations according to its type. Typical wireless networks are made up of cells having different types, i.e., different sizes and deployment purposes. In general terms the cell sizes may be referred to (from largest to smallest) as macro-cells, micro-cells, pico-cells, and femto-cells. Cell deployment purposes include relay cells, open subscriber group cells, closed subscriber group cells, semi-open subscriber group cells, and the like.

A step 230 of method 200 is to set a load balancing parameter for each one of the plurality of base stations according to its type. The load balancing parameter, denoted herein by the symbol $\alpha$, provides a uniform, network-wide protocol for making association decisions that results in better overall network performance. The protocol may be implemented according to the following load balancing algorithm.

Let i be the base station index, $r_i$ be the achievable rate from $BS_i$ (which is computed by $r_i=\log_2(1+\xi_i)$), $\rho_i$ be the base station utilization factor of $BS_i$, $\xi$ be a channel quality parameter such as SINR or any other physical layer measurement metric that may be used to indicate achievable data rate between base station and mobile station, and a be the parameter that determines the degree of load balancing. Then, the selected BS index i, denoted by i*, is given by $$i^* = \underset{i \in \{1,2,\ldots N\}}{\operatorname{argmax}} \; (1-\rho_i)^\alpha \log_2(1+\xi_i). \qquad \text{(Expression 1)}$$

This algorithm is named the "Load-$\alpha$-ware" rule because the parameter $\alpha$ gives a unified approach for base station selection: load balancing (from the network perspective) and maximum rate or SINR (from the user's perspective), as is further discussed in the following paragraphs.

Baseline (best connectivity or rate only): When $\alpha=0$, the association decision is purely based on the user's perspective, i.e., based on the channel quality only, and oblivious to network traffic conditions. It can be shown that setting $\alpha=0$ maximizes the arithmetic mean of the base station idle times. Base station idle time is defined as the fraction of time when the BS is idle. Note that BS idle time is 1−BS utilization.

Proportional-fair method (rate preferred): As $\alpha$ increases, the base station selection decision becomes more based on the network perspective, i.e., the base station utilization. It can be shown that $\alpha=1$ corresponds to maximizing the geometric mean of the base station idle times.

Delay-optimal method (load preferred): When $\alpha=2$, the decision becomes optimal in the sense of average file transfer. It can be shown that $\alpha=2$ corresponds to maximizing the harmonic mean of the base station idle times.

Lowest-load method (load only): As $\alpha$ increases further, the decision is increasingly biased toward traffic conditions until finally, when $\alpha$ is infinity, the decision is based purely on the load itself and is oblivious to channel quality.

Although the cell selected according to Expression 1 is mathematically optimal, it was derived assuming the mobile station does not move during file transfer. However, if the mobile station moves quickly such that frequent handovers are required, HO cost should also be taken into account. Therefore, embodiments of the invention also consider mobile station mobility and induced HO cost. Let $\beta$ be the expected HO cost measured in bits per unit HO. It includes the airlink message overheads during the HO process, the backbone messaging cost, and the opportunistic cost during the service interruption time. For example, if the service interruption time per HO is 100 milliseconds (ms), and the achievable rate is 1 Megabit per second (Mbps), then the HO cost should be counted as 100,000 bits.

An essential part of determining mobility is the estimation of the sojourn time within the target cell. This depends on the cell size and the mobility speed. Let $T_i$ be the expected sojourn time of the mobile station in the $i^{th}$ cell. Then, the modified cell association algorithm is given by $$i^* = \underset{i \in \{1,2,\ldots N\}}{\operatorname{argmax}} (1-\rho_i)^\alpha \log_2(1+\xi_i) - \beta/T_i. \quad \text{(Expression 2)}$$

The accurate estimation of $T_i$ depends on the knowledge of the mobility speed, which is an open issue. For example, if the mobile station has global positioning system (GPS) capability, mobility speed can be accurately measured. Note that many cellular telephones have GPS-based car navigation systems, and that can be exploited for this purpose. Otherwise physical (PHY) layer Doppler estimation or media access control (MAC) layer history of HO frequency can be used. For example, the mobile station may estimate its sojourn time in a target cell by dividing cell range with its estimated speed, which speed could either be based on a PHY layer Doppler estimation signal or a history of handover frequency signal available from a MAC layer.

A step 240 of method 200 is, for a handover event involving a handover from a first base station (with which a mobile station is currently associated and which is a first one of the plurality of base stations) to a second base station (to which the mobile station will be handed over and which is a second one of the plurality of base stations), to select the second base station according to a process that takes into account the load balancing parameters of both the first base station and the second base station. According to step 240, a mobile station follows different calculations (i.e., expressions having different values of α) for different base station types and thus effectively uses different load balancing policies in different handover scenarios, e.g., macro-to-macro handovers, macro-to-pico handovers, etc. In one embodiment, the process mentioned in step 240 comprises determining which one of the plurality of base stations yields a maximum value of an expression involving a base station utilization factor, a channel quality parameter, and the load balancing parameter. According to one embodiment, the expression is $$(1-\rho_i)^\alpha \log_2(1+\xi_i) \quad \text{(Expression 3)}$$

where i is a base station index and $i \in \{1, 2, 3, \ldots, N\}$, $\rho$ is the base station utilization factor, α is the load balancing parameter, and $\xi$ is the channel quality parameter. As an example, the channel quality parameter can be a signal to interference and noise ratio. (Note that determining which one of the plurality of base stations yields a maximum value of Expression 3 is equivalent to solving Expression 1.)

In another embodiment, the process mentioned in step 240 comprises determining which one of the plurality of base stations yields a maximum value of an expression involving a base station utilization factor, a channel quality parameter, an expected sojourn time, an expected handover cost, and the load balancing parameter. According to one embodiment, the expression is $$(1-\rho_i)^\alpha \log_2(1+\xi_i) - \beta/T_i \quad \text{(Expression 4)}$$

where i is a base station index and $i \in \{1, 2, 3, \ldots, N\}$, $\rho$ is the base station utilization factor, α is the load balancing parameter, $\xi$ is the channel quality parameter, β is the expected handover cost, and $T_i$ is the expected sojourn time. As an example, the channel quality parameter can be a signal to interference and noise ratio. (Note that determining which one of the plurality of base stations yields a maximum value of Expression 4 is equivalent to solving Expression 2.)

It may be observed that the existing association schemes represent a subset of Expression 4, namely, an expression arrived at by setting α=0 and β=0. In other words, as has been discussed, existing solutions select the base station with the highest SINR without considering cell loads or mobile station mobility. Because this is the simplest case, there is no framework defined in the standard to allow new polices to be used, such as load balancing or HO cost based cell selection.

Figure 3:
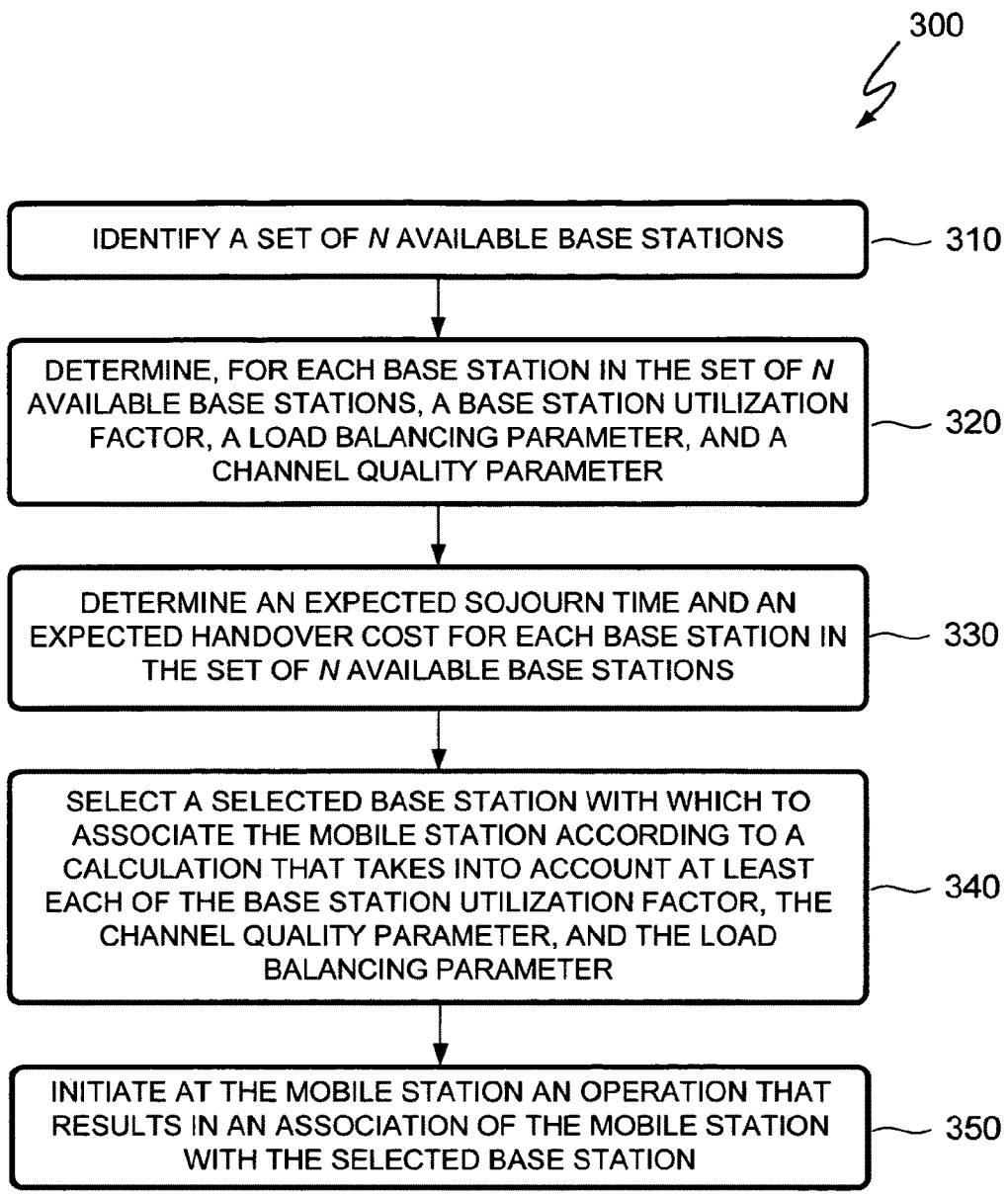
FIG. 3 is a flowchart illustrating a method of selecting a base station with which to associate a mobile station in a wireless network according to an embodiment of the invention.

FIG. 3 is a flowchart illustrating a method 300 of selecting a base station with which to associate a mobile station in a wireless network according to an embodiment of the invention. As an example, the wireless network can be similar to wireless network 100 that is shown in FIG. 1.

A step 310 of method 300 is to identify a set of N available base stations. As an example, the set of N available base stations can be similar to base stations 111, 121, and 131 that are shown in FIG. 1 (where N is equal to 3). In one embodiment, identifying the set of N available base stations comprises using the mobile station to scan the wireless network in an attempt to detect a base station signal and then including in the set of N available base stations each base station from which a base station signal is detected. In other words, the set of N available base stations includes all of the base stations from which the mobile station can receive a signal. In another embodiment, identifying the set of N available base stations comprises communicating via the backbone network to obtain system information of neighbor base stations. In other words, system information can be obtained via the backbone.

A step 320 of method 300 is to determine, for each base station in the set of N available base stations, a base station utilization factor, a load balancing parameter, and a channel quality parameter. As an example, the base station utilization factor, the load balancing parameter, and the channel quality parameter can be similar to, respectively, the parameters ρ, α, and ξ that have been discussed earlier herein. As discussed in more detail below, the word "determining" as used herein in this context in connection with a particular parameter includes a sense in which "determining" means calculating the particular parameter directly and also includes a sense in which "determining" means receiving the particular parameter as calculated elsewhere. As an example, the channel quality parameter can be a signal to interference and noise ratio.

In one embodiment, step 320 or another step further comprises determining a cell type for each base station in the set of N available base stations. As an example, determining the cell type can comprise receiving at the mobile station information regarding the cell type from the base station. Cell type can include, for example, cell size, cell deployment purpose, or the like, as described above. Determining the cell type can assist with the determination of, for example, the load balancing parameter and the expected sojourn time.

Similarly, in one embodiment, determining the channel quality parameter (such as the signal to interference and noise ratio) comprises using the mobile station to scan the network and to measure or otherwise calculate the channel quality parameter. In another embodiment, determining the channel quality parameter comprises receiving at the mobile station the channel quality parameter as determined by or at some other portion of the wireless network.

Similarly, in one embodiment, determining the base station utilization factor comprises using the mobile station to scan the network and to measure or otherwise calculate the base station utilization factor for each base station in the set of N available base stations on its own. In another embodiment, determining the base station utilization factor comprises receiving the base station utilization factor at the mobile station. In other words, the base station utilization factor is computed, selected, identified, or otherwise determined by or at some other portion of the wireless network and then transmitted or otherwise made available to the mobile station.

One simple way to apply the methods described herein is to embed the described parameters in the system broadcast message. This involves the base station broadcasting its own information as well as neighboring base station information. As an example, receiving the base station utilization factor at the mobile station can comprise receiving at the mobile station a Type-Length-Value (TLV) definition of the base station utilization factor in a neighbor advertisement message (MOB_NBR-ADV), collecting at the mobile station the base station utilization factor from a primary broadcast channel (such as super frame header (SFH) of IEEE 802.16m or downlink channel descriptor (DCD) of IEEE 802.16e), or the like.

In certain embodiments where a TLV definition of both $\alpha$ and cell load is included in (MOB_NBR-ADV), the mobile station can figure out whether it needs to scan a particular base station at all. For example, the mobile station may skip a base station if it sees a large $\alpha$ value (e.g., 2 or larger) as well as a high cell load. The system configuration information and their copies carried in (MOB_NBR-ADV) may change over time depending on network operations: $\alpha$ may be "fixed" at 0, for example, as long as the macro-cell is not heavily loaded but the cell may decide to switch $\alpha$ to 2, for example, when its traffic load exceeds a certain threshold. And either the base station or the mobile station may make the decision regarding which is the best cell for the HO based on channel quality measurement during scanning as well as load information and $\alpha$ parameter. Similarly, with load information and $\alpha$ parameter implemented in the primary broadcast channel, the mobile station may properly pick a target cell for network entry with load balancing automatically achieved. Handovers are initiated based on cost, cell type information, and estimated mobility as well as other regular HO trigger parameters, which can efficiently avoid an undesired HO.

In some embodiments, as mentioned, cell type has to be defined and broadcast in additional to load information and $\alpha$ parameter. For example, one can have a rough granularity of macro-cell, micro-cell and pico-cell, from the largest to the smallest, each with rough coverage area predefined or dynamically configured (which requires additional broadcast).

A significant benefit of the above approaches is that load balancing and cell selection are managed in an appropriate, uniform manner. Currently, load balancing is done "blindly" at the base station, with the base station simply picking mobile stations and forcing them to move (via a HO event) to a particular neighbor cell. This blind approach causes confusion as the mobile station may not be aware of the criteria on which the base station's decision is based and therefore may refuse the HO command or may perform an uncontrolled HO to a target cell the mobile station favors, e.g., the target cell with the best SINR. In contrast, embodiments of the invention enable a simple system configuration parameter that can be shared between the network and the mobile station that covers all load balancing scenarios and reduces uncontrolled/unsuccessful HOs.

A step 330 of method 300 is to determine an expected sojourn time and an expected handover cost for each base station in the set of N available base stations. Step 330 may be omitted in some embodiments, such as those where mobile station mobility can be ignored, but, if performed, likely results in better decisions regarding mobile station association. As an example, the expected sojourn time and the expected handover cost can be similar to, respectively, the parameters $T_i$ and $\beta$ that have been discussed earlier herein.

A step 340 of method 300 is to select a selected base station with which to associate the mobile station according to a calculation that takes into account each of the base station utilization factor, the channel quality parameter, and the load balancing parameter. As an example, the calculation can comprise finding a value of i that yields a maximum value of Expression 3, where i is a real, positive integer that acts as an index of the available base stations.

In embodiments of method 300 where step 330 is performed, step 340 as presented above may be replaced with an alternate step 340, which is to select the selected base station according to a second calculation instead of the first calculation, the second calculation taking into account the expected sojourn time and the expected handover cost as well as each of the base station utilization factor, the channel quality parameter, and the load balancing parameter. As an example, the second calculation comprises finding a value of i that yields a maximum value of Expression 4, where i is a real, positive integer that acts as an index of the available base stations.

A step 350 of method 300 is to initiate at the mobile station an operation that results in an association of the mobile station with the selected base station.

Figure 4:
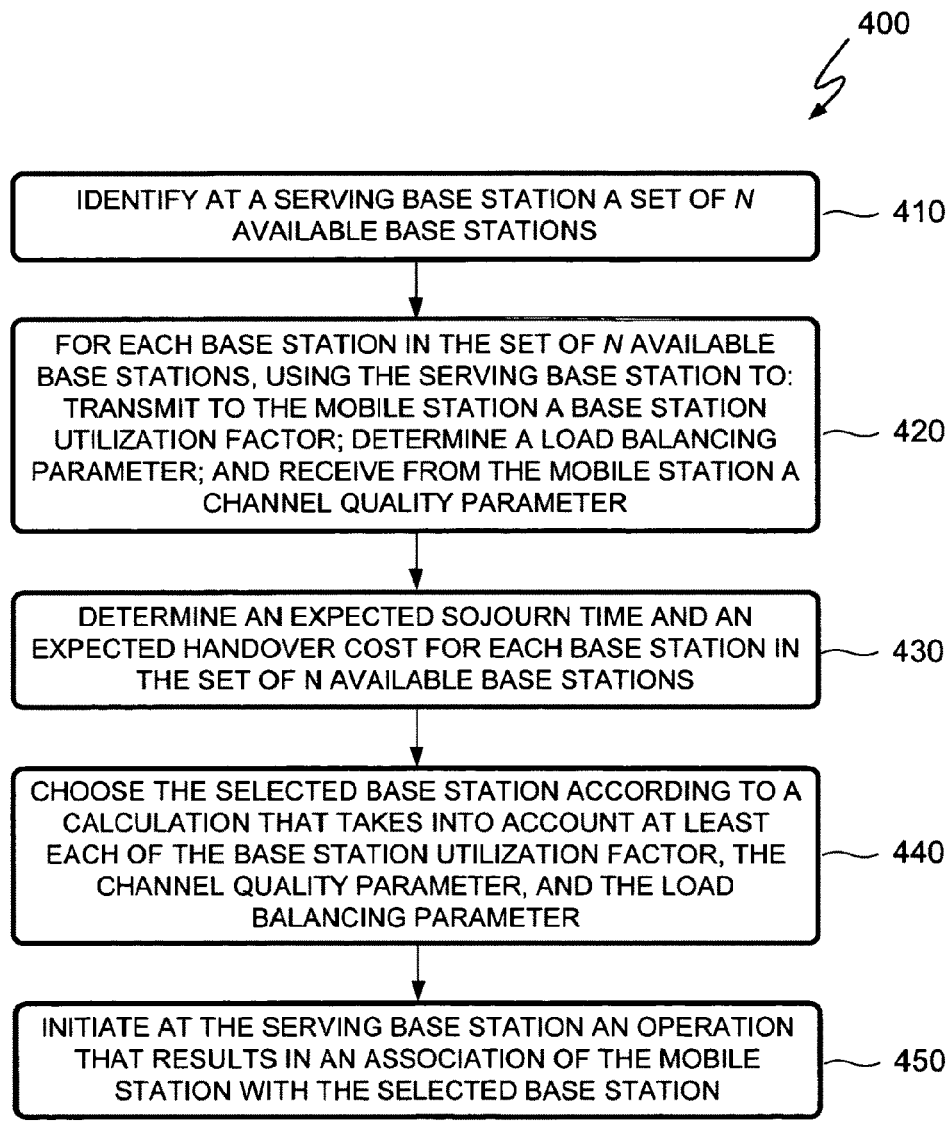
FIG. 4 is a flowchart illustrating a method of selecting a base station with which a mobile station is to be associated, called a selected base station, in a wireless network according to an embodiment of the invention.

FIG. 4 is a flowchart illustrating a method 400 of selecting a base station with which a mobile station is to be associated, called a selected base station, in a wireless network according to an embodiment of the invention. As an example, the wireless network can be similar to wireless network 100 that is shown in FIG. 1.

A step 410 of method 400 is to identify at a serving base station a set of N available base stations. As an example, the set of N available base stations can be similar to base stations 111, 121, and 131 that are shown in FIG. 1 (where N is equal to 3). In one embodiment, step 410 comprises using the serving base station to scan the wireless network in an attempt to detect a base station signal and including in the set of N available base stations the serving base station as well as each other base station from which a base station signal is detected.

A step 420 of method 400 is, for each base station in the set of N available base stations, using the serving base station to: transmit to the mobile station a base station utilization factor; determine a load balancing parameter; and receive from the mobile station a channel quality parameter. As an example, the base station utilization factor, the load balancing parameter, and the channel quality parameter can be similar to, respectively, the parameters $\rho$, $\alpha$, and $\xi$ that have been discussed earlier herein. In one embodiment, using the serving base station to determine the load balancing parameter comprises determining a distance between the mobile station and a cell edge and determining whether the base station utilization factor exceeds a threshold value. These values may be used to calculate the load balancing parameter at the serving base station, and the load balancing parameter may then be transmitted to the mobile station.

In one embodiment, step 420 comprises determining the base station utilization factor by using the serving base station to scan the network and to measure the base station utilization factor for each of the set of N available base stations prior to transmitting the base station utilization factor to the mobile station. As an example, transmitting the base station utilization factor can comprise broadcasting a neighbor advertisement message containing a Type-Length-Value (TLV) definition of the base station utilization factor, broadcasting the base station utilization factor over a primary broadcast channel (both of which are discussed in more detail above), or the like. In one embodiment, determining the base station utilization factor comprises receiving at the serving base station the base station utilization factor as measured or otherwise calculated at the mobile station.

In one embodiment, step 420 or another step further comprises, for each base station (or its associated cell) in the set of N available base stations, defining and broadcasting a cell type. Cell type can include, for example, cell size, cell deployment purpose, or the like, as described above. Defining the cell type can assist with the determination of, for example, the load balancing parameter and the expected sojourn time.

A step 430 of method 400 is to determine an expected sojourn time and an expected handover cost for each base station in the set of N available base stations. Step 430 may be omitted in some embodiments, such as those where mobile station mobility can be ignored, but, if performed, likely results in better decisions regarding mobile station association. As an example, the expected sojourn time and the expected handover cost can be similar to, respectively, the parameters Ti and β that have been discussed earlier herein.

In one embodiment, determining the expected handover cost comprises determining an airlink message overhead, a backbone messaging cost, and an opportunistic cost during a service interruption time. For different types of cells in the neighbor list, the serving base station defines HO trigger-action TLV in MOB_NBR-ADV. In addition, if necessary, the serving base station may also define an extra cost term that contributes to β, such as when the backbone signaling is expensive, a situation that may apply, for example, when two cells are not well connected or have different ASN gateways.

A step 440 of method 400 is to choose the selected base station according to a calculation that takes into account each of the base station utilization factor, the channel quality parameter, and the load balancing parameter. As an example, the calculation can comprise finding a value of i that yields a maximum value of Expression 3, where i is a real, positive integer that acts as an index of the available base stations.

In embodiments of method 400 where step 430 is performed, step 440 as presented above may be replaced with an alternate step 440, which is to select the selected base station according to a second calculation instead of the first calculation, the second calculation taking into account the expected sojourn time and the expected handover cost as well as each of the base station utilization factor, the channel quality parameter, and the load balancing parameter. As an example, the second calculation comprises finding a value of i that yields a maximum value of Expression 4, where i is a real, positive integer that acts as an index of the available base stations.

A step 450 of method 400 is to initiate at the serving base station an operation that results in an association of the mobile station with the selected base station.

Figure 5:
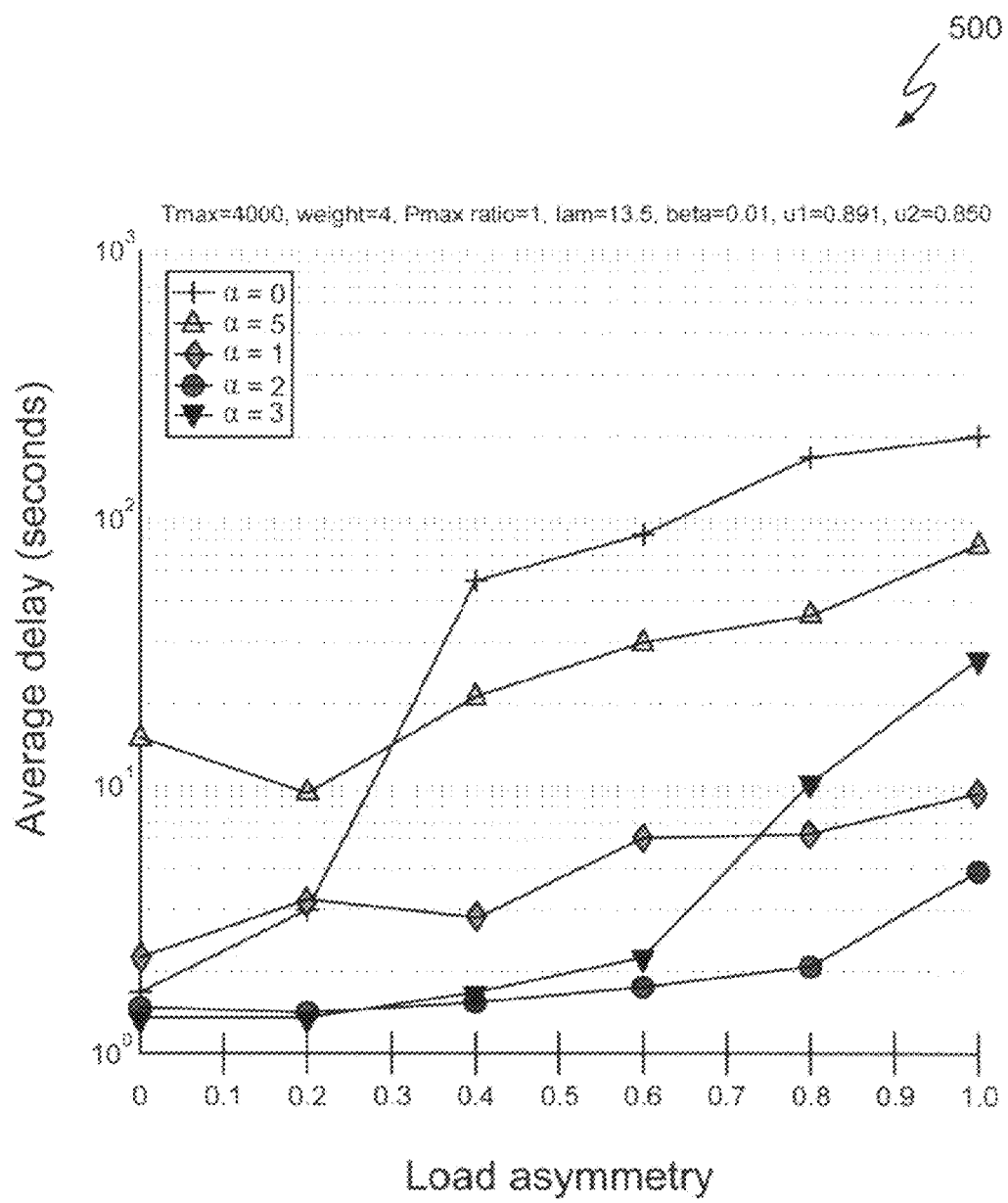
FIG. 5 is a graph illustrating a simulation result of a rule for determining mobile station associations in wireless networks for selected values of a load balancing parameter according to an embodiment of the invention.

FIG. 5 is a graph 500 illustrating a simulation result of the Load-α-ware rule for selected values of α. As can be seen, as the load asymmetry increases the traditional method (α=0) exhibits poor delay performance while α=2 shows the best delay performance. This result agrees closely with the theoretical discussion given above.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the methods of managing network traffic within wireless networks, and the related algorithms and frameworks discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of managing network traffic within a wireless network, the method comprising:
   categorizing each one of a plurality of base stations within the wireless network according to its type;
   setting a load balancing parameter for each one of the plurality of base stations according to its type;
   for a handover event involving a handover from a first base station, which is a first one of the plurality of base stations, to a second base station, which is a second one of the plurality of base stations, selecting the second base station according to a process that takes into account the load balancing parameters of both the first base station and the second base station, wherein, the process comprises determining which one of the plurality of base stations yields a maximum value of an expression involving a base station utilization factor, a channel quality parameter, and the load balancing parameter wherein the expression is $(1-\rho_i)^\alpha \log_2(1+\xi_i)$, where i is a base station index and i∈{1, 2, 3, . . . , N}, ρ is the base station utilization factor, α is the load balancing parameter, (ξ) is the channel quality parameter.

2. The method of claim 1 wherein:
   the channel quality parameter is a signal to interference and noise ratio.

3. The method of claim 1 wherein:
   the process comprises determining which one of the plurality of base stations yields a maximum value of an expression involving a base station utilization factor, a channel quality parameter, an expected sojourn time, an expected handover cost, and the load balancing parameter.

4. The method of claim 3 wherein:
   the expression is $(1-\rho_i)^\alpha \log_2(1+\xi_i)-\beta/T_i$, where i is a base station index and i∈{1, 2, 3, . . . , N}, ρ is the base station utilization factor, α is the load balancing parameter, ξ is the channel quality parameter, β is the expected handover cost, and $T_i$ is the expected sojourn time.

5. A method of selecting a base station with which to associate a mobile station in a wireless network, the method comprising:
   identifying a set of N available base stations;
   for each base station in the set of N available base stations:
   determining a base station utilization factor;
   determining a load balancing parameter; and
   determining a channel quality parameter;
   selecting a selected base station with which to associate the mobile station according to a first calculation that takes into account the base station utilization factor, the channel quality parameter, and the load balancing parameter; and initiating at the mobile station an operation that results in an association of the mobile station with the selected base station wherein the first calculation comprises finding a value of i that yields a maximum value of $(1-\rho_i)^\alpha \log_2(1+\xi_i)$, where i is a base station index and $i \in \{1, 2, 3, \ldots, N\}$, $\rho$ is the base station utilization factor, $\alpha$ is the load balancing parameter, and ($\xi$) is the channel quality parameter.

6. The method of claim 5 wherein:
the channel quality parameter is a signal to interference and noise ratio.

7. The method of claim 5 wherein:
identifying the set of N available base stations comprises:
using the mobile station to scan the wireless network in an attempt to detect a base station signal; and
including in the set of N available base stations each base station from which a base station signal is detected.

8. The method of claim 5 wherein:
determining the base station utilization factor comprises receiving the base station utilization factor at the mobile station.

9. The method of claim 8 wherein:
receiving the base station utilization factor at the mobile station comprises one of:
receiving at the mobile station a Type-Length-Value definition of the base station utilization factor in a neighbor advertisement message; and
collecting at the mobile station the base station utilization factor from a primary broadcast channel.

10. The method of claim 5 further comprising:
for each base station in the set of N available base stations, determining an expected sojourn time and an expected handover cost; and
selecting the selected base station according to a second calculation instead of the first calculation, the second calculation taking into account the expected sojourn time and the expected handover cost as well as each of the base station utilization factor, than channel quality parameter, and the load balancing parameter.

11. The method of claim 10 wherein:
the second calculation comprises finding a value of i that yields a maximum value of $(1-\rho_i)^\alpha \log_2(1+\xi_i)-\beta/T_i$, where i is a base station index and $i \in \{1, 2, 3, \ldots, N\}$, $\rho$ is the base station utilization factor, $\alpha$ is the load balancing parameter, $\xi$ is the channel quality parameter, $\beta$ is the expected handover cost, and $T_i$ is the expected sojourn time.

12. The method of claim 11 further comprising:
for each base station in the set of N available base stations, determining a cell type.

13. A method of selecting a base station, called a selected base station, with which a mobile station is to be associated in a wireless network, the method comprising:

identifying at a serving base station a set of N available base stations;
using the serving base station to:
transmit to the mobile station a base station utilization factor for each base station in the set of N available base stations;
determine a load balancing parameter for each base station in the set of N available base stations; and
receive from the mobile station a channel quality parameter for each base station in the set of N available base stations; choosing the selected base station according to a first calculation that takes into account the base station utilization factor, the channel quality parameter, and the load balancing parameter; and
initiating at the serving base station an operation that results in an association of the mobile station with the selected base station;
wherein the first calculation comprises finding a value of i that yields a maximum value of $(1-\rho_i)^\alpha \log_2(1+\xi_i)$, where i is a base station index and $i \in \{1, 2, 3, \ldots, N\}$, $\rho$ is the base station utilization factor, $\alpha$ is the load balancing parameter, and ($\xi$) is the channel quality parameter.

14. The method of claim 13 further comprising:
for each base station in the set of N available base stations, determining an expected sojourn time and an expected handover cost; and
selecting the selected base station according to a second calculation instead of the first calculation, the second calculation taking into account the expected sojourn time and the expected handover cost as well as each of the base station utilization factor, the channel quality parameter, and the load balancing parameter.

15. The method of claim 14 wherein:
the second calculation comprises finding a value of i that yields a maximum value of $(1-\rho_i)^\alpha \log_2(1+SINR_i)-\beta/T_i$ where $\beta$ is the expected handover cost and $T_i$ is the expected sojourn time.

16. The method of claim 13 wherein:
identifying the set of N available base stations comprises:
using the serving base station to scan the wireless network in an attempt to detect a base station signal; and
including in the set of N available base stations the serving base station as well as each other base station from which a base static n signal is detected.

17. The method of claim 13 further comprising:
for each base station in the set of N available base stations, defining a cell type; and
broadcasting the cell type.

18. The method of claim 13 wherein:
using the serving base station to determine the load balancing parameter comprises:
determining a distance between the mobile station and a cell edge; and
determining whether the base station utilization factor exceeds a threshold value.

* * * * *